(12) United States Patent
Shi

(10) Patent No.: US 12,304,118 B2
(45) Date of Patent: May 20, 2025

(54) METHOD FOR PROCESSING PVC BALL

(71) Applicant: Dongguan Jiaheng Toys Co., Ltd., Dongguan (CN)

(72) Inventor: Shaofeng Shi, Chuzhou (CN)

(73) Assignee: Dongguan Jiaheng Toys Co., Ltd., Dongguan (CN)

( * ) Notice: Subject to any disclaimer, the term of this patent is extended or adjusted under 35 U.S.C. 154(b) by 130 days.

(21) Appl. No.: 18/125,804

(22) Filed: Mar. 24, 2023

(65) Prior Publication Data

US 2023/0311370 A1    Oct. 5, 2023

(30) Foreign Application Priority Data

Apr. 2, 2022 (CN) .......................... 202210350218.4

(51) Int. Cl.
| | |
|---|---|
| *B29C 41/04* | (2006.01) |
| *B29C 41/00* | (2006.01) |
| *B29C 41/46* | (2006.01) |
| *B29C 59/02* | (2006.01) |
| *B29D 22/04* | (2006.01) |
| B29K 27/06 | (2006.01) |
| B29K 105/00 | (2006.01) |
| B29L 31/54 | (2006.01) |

(52) U.S. Cl.
CPC ............ *B29C 41/04* (2013.01); *B29C 41/003* (2013.01); *B29C 41/46* (2013.01); *B29C 59/02* (2013.01); *B29K 2027/06* (2013.01); *B29K 2105/0032* (2013.01); *B29L 2031/54* (2013.01)

(58) Field of Classification Search
CPC ....... B29C 41/04; B29C 41/003; B29C 41/46; B29C 59/02; B29K 2027/06; B29K 2105/0032; B29L 2031/54; B29D 22/04
See application file for complete search history.

(56) References Cited

U.S. PATENT DOCUMENTS

| | | | | |
|---|---|---|---|---|
| 4,519,972 | A * | 5/1985 | Stevenson | B44C 3/048 249/103 |
| 7,156,940 | B1 * | 1/2007 | Stevenson | B29C 41/04 264/316 |
| 2021/0093930 | A1 * | 4/2021 | Shi | B29C 41/04 |
| 2021/0138309 | A1 * | 5/2021 | Hu | A63B 45/00 |

* cited by examiner

*Primary Examiner* — Galen H Hauth
*Assistant Examiner* — Baileigh Kate Darnell
(74) *Attorney, Agent, or Firm* — Nitin Kaushik

(57) ABSTRACT

The present disclosure provides a method for processing a PVC ball, including: Step A: carrying out a first ball shaping of a PVC paste located inside a first mold using a roto-cast machine or a rotational molding machine, to produce a hollow PVC ball; Step B: charging a gas to an interior of the shaped ball, so that the ball has an external diameter equal to a diameter of an inner cavity of a second mold; and Step C: placing the gas-charged ball into the second mold, then carrying out a second texture shaping of the shaped gas-charged ball located inside the second mold using the roto-cast machine or the rotational molding machine, to produce a texture on a surface of the shaped PVC ball. This method can produce a PVC ball having a predetermined texture and a predetermined pattern.

6 Claims, 4 Drawing Sheets

METHOD FOR PROCESSING PVC BALL

CROSS REFERENCE TO RELATED APPLICATION

This application claims the benefit of and takes priority from Chinese Patent Application No. 202210350218.4 filed on Apr. 2, 2022, the contents of which are herein incorporated by reference.

TECHNICAL FIELD

The present disclosure relates to the technical field of processing and manufacturing of balls, more particular to a method for processing a PVC (Polyvinyl Chloride) ball.

BACKGROUND

At present, PVC balls are produced all by plasticized shaping. To meet the aesthetic or personality requirements of users for PVC balls, it is often needed to print a pattern and a texture on the surface of the PVC ball. However, the existing processing methods are very difficult to produce a predetermined texture on the surface of the PVC ball, let along to produce a predetermined texture on the surface of the PVC ball after printing a predetermined pattern on it.

SUMMARY

It is an object of the present disclosure to provide a method for processing a PVC ball, which can produce a PVC ball having a predetermined pattern and a predetermined texture, so as to resolve the technical problems in existing technologies that it is very difficult to produce a texture and produce a texture after printing a pattern on the PVC ball in the processing course.

In order to achieve the above aim, the present disclosure provides the following technical solution.

The provides a method for processing a PVC ball, including the following steps:
  Step A: carrying out a first ball shaping of a PVC paste located inside a first mold using a roto-cast machine or a rotational molding machine, to produce a hollow PVC ball;
  Step B: charging a gas to an interior of the shaped ball, so that the ball has an external diameter equal to a diameter of an inner cavity of a second mold; and
  Step C: placing the gas-charged ball into the second mold, then carrying out a second texture shaping of the shaped gas-charged ball located inside the second mold using the roto-cast machine or the rotational molding machine, to produce a texture on a surface of the shaped PVC ball.

Further, the first ball shaping includes the following steps:
  Step A1: preparing the PVC paste suitable for roto-cast or rotational molding processes using mixing equipment;
  Step A2: pouring the prepared PVC paste into the first mold;
  Step A3: closing a mold cover and tightening it using a bolt, then placing the first mold into a furnace chamber of the roto-cast machine or the rotational molding machine to heat for heated and plasticized shaping, and stopping heating after a continuous preset heating time S1, so that the PVC paste is shaped on an inner wall of the first mold by way of roto-cast or rotational molding;
  Step A4: taking the first mold out of the roto-cast machine or the rotational molding machine and then cooling the first mold; and
  Step A5: opening the first mold to obtain the hollow PVC ball.

Further, the first mold is heated at a temperature of 300-450 degrees Celsius, and the preset heating time S1 is 5-12 minutes.

Further, the first ball shaping further includes the following step:
  Step A11: before pouring the PVC paste into the first mold, sticking a PVC film having a predetermined pattern onto an inner surface of the first mold to accomplish labelling.

Further, in the PVC paste, a PVC resin has a mass percentage of 40%-60%, a plasticizer has a mass percentage of 40%-60%, and an auxiliary agent has a mass percentage of 3%-8%.

Further, a coloring pigment is added into the PVC paste.

Further, the second texture shaping includes the following steps:
  Step C1: placing a gas-charged smooth-surfaced hollow PVC ball into a second mold having a predetermined texture, and closing a mold cover;
  Step C2: placing the second mold into the furnace chamber of the roto-cast machine or the rotational molding machine to heat, wherein the internal gas of the PVC ball expands, through the principle of thermal expansion, so that the PVC ball presses against an inner wall of the second mold and the PVC ball forms a texture on the surface through heated and plasticized shaping, then stopping heating after a continuous preset heating time S1;
  Step C3: taking the second mold out of the furnace chamber of the roto-cast machine or the rotational molding machine and cooling it; and
  Step C4: opening the second mold to obtain a PVC ball having the predetermined texture or having both the predetermined pattern and the predetermined texture.

Further, the second mold is heated at a temperature of 250-400 degrees Celsius, and the preset heating time S2 is 5-10 minutes.

Further, the first mold is cooled by way of water cooling or air cooling.

Further, the second mold is cooled by way of water cooling or air cooling.

The present disclosure has the following beneficial effects compared to the existing technologies.

According to the method for processing a PVC ball provided by the present disclosure, a processed shaped PVC ball, after being charged with a gas, is placed the second time into a mold having a predetermined texture to heat and shape again, so that the predetermined texture is imprinted on the surface of the ball, meanwhile, before the first shaping, a PVC film having a predetermined pattern is stuck onto a mold, so that a PVC ball having both the predetermined pattern and the predetermined texture can be obtained.

BRIEF DESCRIPTION OF THE DRAWINGS

In order to describe the technical solutions in the embodiments of the present disclosure or in the prior art more clearly, drawings required to be used in the description of the embodiments or the prior art will be briefly introduced below. Apparently, the drawings in the description below are merely some embodiments of the present disclosure. Those ordinarily skilled in the art also can obtain other drawings according to these provided drawings without creative work.

DETAILED DESCRIPTION OF THE EMBODIMENTS

The purpose, the technical solution and the advantages of the present disclosure will become more apparent and understandable from a detailed description below of the technical solution of the present disclosure. Obviously, those embodiments described hereinafter are simply part embodiments of the present disclosure, rather than all the embodiments. All other embodiments obtained by those ordinary skill in the art based on the embodiments in the present disclosure without creative work are intended to be included in the scope of protection of the present disclosure.

As shown in FIG. 1 to FIG. 5, the present disclosure provides a method for processing a PVC ball, including the following steps:

Step A: first shaping of ball: carrying out a first ball shaping of a PVC paste located inside a first mold using a roto-cast machine or a rotational molding machine, to produce a hollow PVC ball.

Specifically, the first ball shaping includes the following steps:

Step A1: preparing the PVC paste suitable for roto-cast or rotational molding processes using mixing equipment.

In the PVC paste, a PVC resin has a mass percentage of 40%-60%, a plasticizer has a mass percentage of 40%-60%, and an auxiliary agent has a mass percentage of 3%-8%. Meanwhile, an appropriate coloring pigment may be added into the PVC paste too, and the amount of the coloring pigment can be selected as needed.

Figure 4:
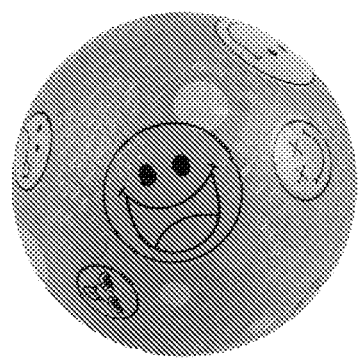
FIG. 4 is a first kind of PVC ball having a texture and a pattern produced by a method for processing a PVC ball according to the present disclosure.
Figure 5:
FIG. 5 is a second kind of PVC ball having a texture and a pattern produced by a method for processing a PVC ball according to the present disclosure.

Here, it should be noted that if to produce a PVC ball having a predetermined texture, just execute Step A2, and if to produce a PVC ball having both a predetermined pattern and a predetermined texture, as shown in FIG. 4 and FIG. 5, first execute Step A11 and then Step A2. Step A11 specifically includes:

Step A11: before pouring the PVC paste into the first mold, sticking a PVC film having a predetermined pattern onto an inner surface of the first mold to accomplish labelling. Through this step, the first shaped PVC ball may have a predetermined pattern formed on the surface.

Step A2: pouring the prepared PVC paste into the first mold.

Step A3: closing a mold cover and tightening it using a bolt, then placing the first mold into a furnace chamber of the roto-cast machine or the rotational molding machine to heat for heated and plasticized shaping, and stopping heating after a continuous preset heating time S1, so that the PVC paste is shaped on an inner wall of the first mold by way of roto-cast or rotational molding.

Specifically, the first mold is heated at a temperature of 300-450 degrees Celsius, and the preset heating time S1 is 5-12 minutes. That is to say, the first mold is placed into the furnace camber of the roto-cast machine or the rotational molding machine at 300-450 degrees Celsius for 5-12 minutes for heated and plasticized shaping.

Step A4: taking the first mold out of the roto-cast machine or the rotational molding machine and then cooling the first mold.

Further, the first mold is cooled by way of water cooling or air cooling. To improve efficiency and improve cooling speed, the embodiment of the present disclosure cools the first mold by way of water cooling, that is to say, the first mold is taken out of the furnace chamber of roto-cast machine or the rotational molding machine and is then cooled by water. After completing cooling, execute Step A5.

Step A5: opening the first mold to obtain a smooth-surfaced pattern-free hollow PVC ball, or a smooth-surfaced hollow PVC ball printed with the predetermined pattern.

After the predetermined pattern is produced, it is needed to execute the following steps to produce a predetermined texture on the surface of the PVC ball. First, a gas is charged into the PVC ball so that the ball fills an inner cavity of the second mold; then, the internal gas, when heated, is pressurized to expand, enabling the PVC ball to press against the surface of the inner cavity of the second mold, and the second mold, when heated, carries out heated and plasticized shaping of the PVC ball, to make the predetermined texture on the inner surface of the second mold shaped onto the surface of the PVC ball, specifically including:

Step B: charging a gas to an interior of the shaped ball, so that the ball has an external diameter equal to a diameter of an inner cavity of a second mold. Further, air may be charged. Of course, the charging port needs to be sealed, and it should be ensured that the internal gas of the ball will not leak via the charging port when the ball is heated. The sealing mode and sealing structure in this part may be implemented employing the existing technologies.

Step C: placing the gas-charged smooth-surfaced ball into the second mold, then carrying out a second texture shaping of the shaped gas-charged ball located inside the second mold using the roto-cast machine or the rotational molding machine, to produce a texture on the surface of the shaped PVC ball.

Further, the second texture shaping includes the following steps:

Step C1: placing a gas-charged smooth-surfaced hollow PVC ball into a second mold having a predetermined texture, and closing a mold cover. The predetermined texture inside the second mold is prepared by the existing technologies.

Step C2: placing the second mold into the furnace chamber of the roto-cast machine or the rotational molding machine to heat, wherein the internal gas of the PVC ball expands, through the principle of thermal expansion, so that the PVC ball presses against an inner wall of the second mold and the PVC ball forms a texture on the surface through heated and plasticized shaping, then stopping heating after a continuous preset heating time S1.

Specifically, the second mold is heated at a temperature of 250-400 degrees Celsius, and the preset heating time S2 is 5-10 minutes. That is to say, the second mold is placed into the furnace camber of the roto-cast machine or the rotational molding machine at 250-400 degrees Celsius for 5-10 minutes for heated and plasticized shaping. After completing texture shaping, execute Step C3.

Step C3: taking the second mold out of the furnace chamber of the roto-cast machine or the rotational molding machine and cooling it. The second mold may be cooled by way of water cooling or air cooling. To improve efficiency and improve cooling speed, the embodiment of the present disclosure cools the second mold by way of water cooling, that is to say, the second mold is taken out of the furnace chamber of roto-cast machine or the rotational molding machine and is then cooled by water. After completing cooling, execute Step C4.

Step C4: opening the second mold to obtain a PVC ball having the predetermined texture or having both the predetermined pattern and the predetermined texture, as shown in FIG. 5. It should be noted that the predetermined texture on the surface of the PVC ball shown in FIG. 4 is produced using the predetermined texture on the second mold shown in FIG. 3.

According to the method for processing a PVC ball provided by the present disclosure, a processed shaped PVC ball, after being charged with a gas, is placed the second time into a mold having a predetermined texture to heat and shape again, so that the predetermined texture is imprinted on the surface of the ball, meanwhile, before the first shaping, a PVC film having a predetermined pattern is stuck onto a mold, so that a PVC ball having both the predetermined pattern and the predetermined texture can be obtained.

Embodiment 1

Figure 1:
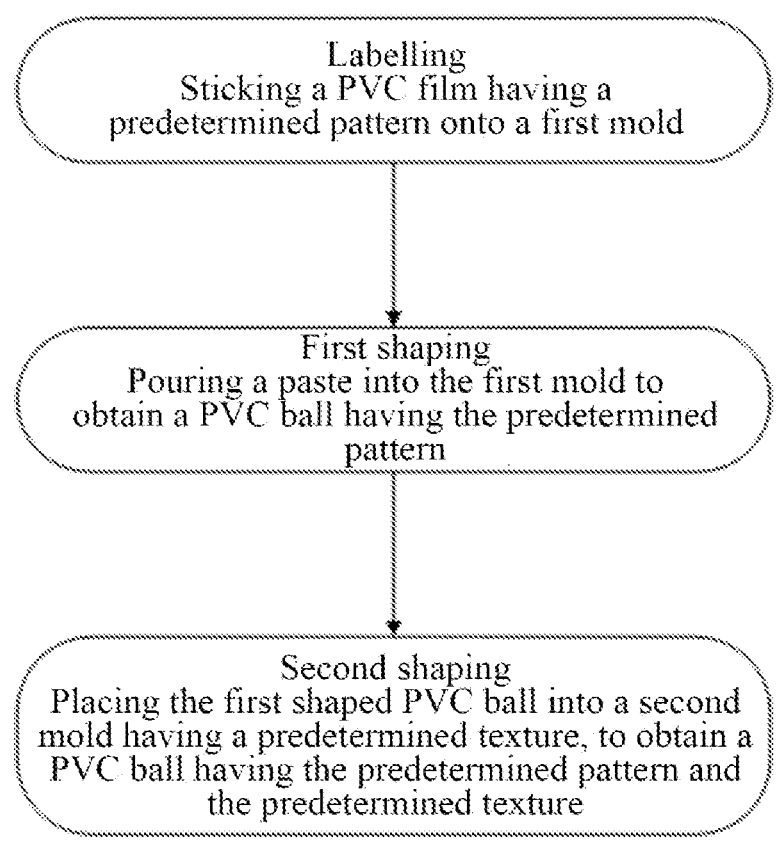
FIG. 1 is a flowchart of a preferred embodiment of a method for processing a PVC ball according to the present disclosure.
Figure 2:
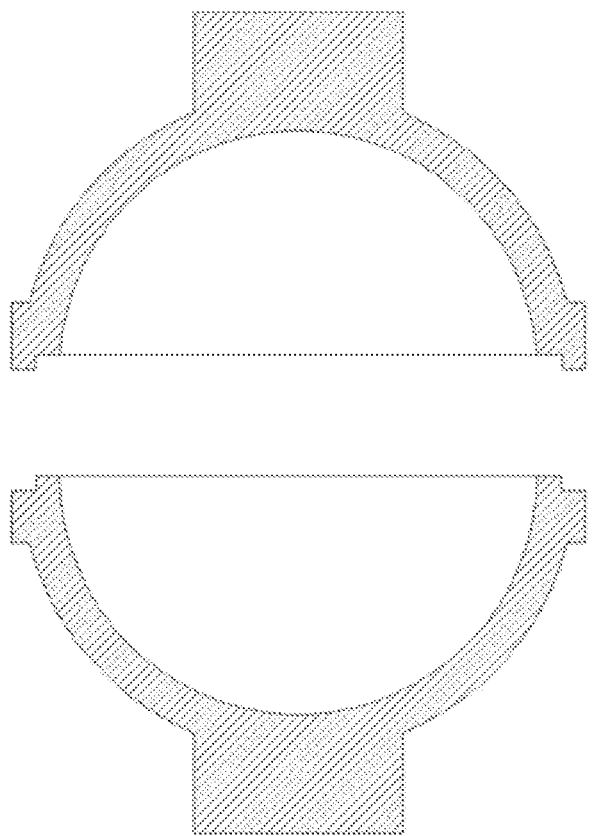
FIG. 2 is a diagram of a first mold in a method for processing a PVC ball according to the present disclosure.
Figure 3:
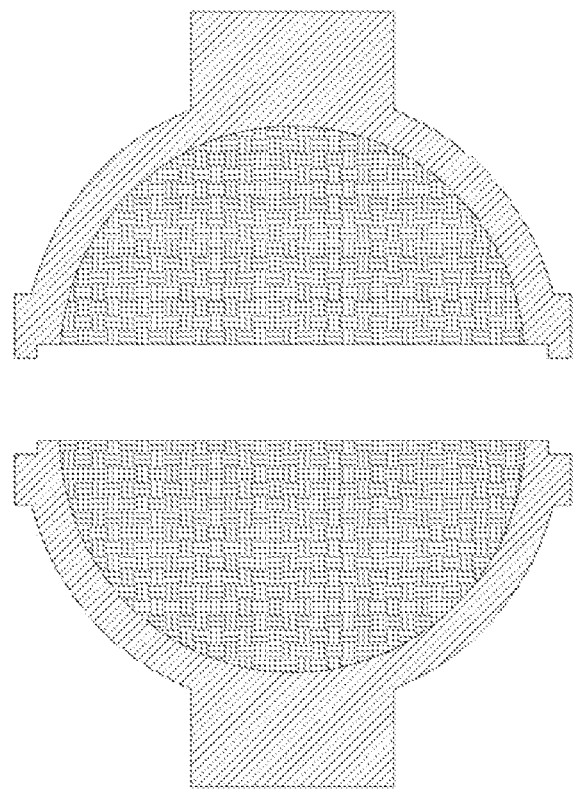
FIG. 3 is a diagram of a second mold in a method for processing a PVC ball according to the present disclosure.

As shown in FIG. 1, first, carrying out labelling: sticking a PVC film printed with a predetermined pattern inside a first mold having a smooth inner surface; then, carrying out a first shaping of ball: pouring a paste into the first mold to obtain a PVC ball having the predetermined pattern; finally, carrying out a second shaping: first, charging a gas to the PVC ball obtained from the first shaping, and then placing it into a second mold having a predetermined texture, to obtain a PVC ball having the predetermined pattern and the predetermined texture.

The above are merely particular embodiments of the present disclosure, and the protection scope of the present disclosure is not limited thereto. All of the variations or substitutions that a person skilled in the art may easily envisage within the technical scope disclosed by the present disclosure should fall within the protection scope of the present disclosure. Therefore, the protection scope of the present disclosure should be subject to the protection scope of the claims appended hereinafter.

What is claimed is:

1. A method for processing a PVC (Polyvinyl Chloride) ball, comprising the following steps:
   Step A: carrying out a first ball shaping of a PVC paste located inside a first mold using a roto-cast machine or a rotational molding machine, to produce a hollow PVC ball, wherein in the PVC paste, a PVC resin has a mass percentage of 40%-60%, a plasticizer has a mass percentage of 40%-60%, and an auxiliary agent has a mass percentage of 3%-8%, wherein the first ball shaping comprises the following steps:
      Step A1: preparing the PVC paste suitable for roto-cast or rotational molding processes using mixing equipment;
      Step A11: sticking a PVC film having a predetermined pattern onto an inner surface of the first mold to accomplish labelling;
      Step A2: pouring the prepared PVC paste into the first mold;
      Step A3: closing a mold cover and tightening it using a bolt, then placing the first mold into a furnace chamber of the roto-cast machine or the rotational molding machine to heat for heated and plasticized shaping, and stopping heating after a continuous preset heating time S1, so that the PVC paste is shaped on an inner wall of the first mold by way of roto-cast or rotational molding;
      Step A4: taking the first mold out of the roto-cast machine or the rotational molding machine and then cooling the first mold; and
      Step A5: opening the first mold to obtain the hollow PVC ball;
   Step B: charging a gas to an interior of the shaped ball, so that the ball has an external diameter equal to a diameter of an inner cavity of a second mold; and
   Step C: placing the gas-charged ball into the second mold, then carrying out a second texture shaping of the shaped gas-charged ball located inside the second mold using the roto-cast machine or the rotational molding machine, to produce a texture on a surface of the shaped PVC ball, wherein the second texture shaping comprises the following steps:
      Step C1: placing a gas-charged smooth-surfaced hollow PVC ball into a second mold having a predetermined texture, and closing a mold cover;
      Step C2: placing the second mold into the furnace chamber of the roto-cast machine or the rotational molding machine to heat, wherein the internal gas of the PVC ball expands, through the principle of thermal expansion, so that the PVC ball presses against an inner wall of the second mold and the PVC ball forms a texture on the surface through heated and plasticized shaping, then stopping heating after a continuous preset heating time S1;
      Step C3: taking the second mold out of the furnace chamber of the roto-cast machine or the rotational molding machine and cooling it; and
      Step C4: opening the second mold to obtain a PVC ball having both the predetermined pattern and the predetermined texture.

2. The method for processing the PVC ball according to claim 1, wherein the first mold is heated at a temperature of 300-450 degrees Celsius, and the preset heating time S1 is 5-12 minutes.

3. The method for processing the PVC ball according to claim 1, wherein a coloring pigment is added into the PVC paste.

4. The method for processing the PVC ball according to claim 1, wherein the second mold is heated at a temperature of 250-400 degrees Celsius, and the preset heating time S2 is 5-10 minutes.

5. The method for processing the PVC ball according to claim 1, wherein the first mold is cooled by way of water cooling or air cooling.

6. The method for processing the PVC ball according to claim 1, wherein the second mold is cooled by way of water cooling or air cooling.

* * * * *